United States Patent
Alsop

(10) Patent No.: US 8,851,498 B2
(45) Date of Patent: Oct. 7, 2014

(54) ADJUSTABLE GEOMETRY BICYCLE REAR WHEEL SUSPENSION SYSTEM

(75) Inventor: Edward Alsop, Madison, WI (US)

(73) Assignee: Trek Bicycle Corporation, Waterloo, WI (US)

( * ) Notice: Subject to any disclaimer, the term of this patent is extended or adjusted under 35 U.S.C. 154(b) by 184 days.

(21) Appl. No.: 13/271,407

(22) Filed: Oct. 12, 2011

(65) Prior Publication Data

US 2013/0093160 A1    Apr. 18, 2013

(51) Int. Cl.
    *B62K 25/28*      (2006.01)
    *B62K 25/04*      (2006.01)
    *B62K 3/02*      (2006.01)

(52) U.S. Cl.
    CPC ............ *B62K 25/286* (2013.01); *B62K 25/04* (2013.01); *B62K 3/02* (2013.01)
    USPC ............................ 280/284; 280/275; 280/283

(58) Field of Classification Search
    USPC .......................... 280/275, 283, 284, 285, 288
    See application file for complete search history.

(56) References Cited

U.S. PATENT DOCUMENTS

| | | | | |
|---|---|---|---|---|
| 3,942,821 | A | * | 3/1976 | Bock .............................. 280/277 |
| 3,974,892 | A | * | 8/1976 | Bolger ........................... 180/227 |
| 4,046,396 | A | | 9/1977 | Taylor et al. ................ 280/281.1 |
| 4,058,181 | A | * | 11/1977 | Buell ............................. 180/227 |
| 4,114,918 | A | * | 9/1978 | Lutz ............................... 280/284 |
| 4,497,506 | A | * | 2/1985 | Miyakoshi et al. ..... 280/124.105 |
| 5,356,165 | A | * | 10/1994 | Kulhawik et al. ............. 280/275 |
| 5,553,881 | A | | 9/1996 | Klassen et al. |
| 5,611,557 | A | | 3/1997 | Farris et al. |
| 5,628,524 | A | | 5/1997 | Klassen et al. |
| 5,813,683 | A | * | 9/1998 | Kulhawik et al. ............. 280/275 |
| 5,927,741 | A | * | 7/1999 | Chi ................................ 280/275 |
| 5,957,473 | A | | 9/1999 | Lawwill |
| 6,073,949 | A | * | 6/2000 | O'Hare et al. ................. 280/283 |
| 6,073,950 | A | | 6/2000 | Busby |
| 6,099,010 | A | | 8/2000 | Busby |
| 6,102,421 | A | | 8/2000 | Lawwill et al. |
| 6,206,397 | B1 | | 3/2001 | Klassen et al. |
| 6,293,574 | B1 | | 9/2001 | Storck |
| 6,378,885 | B1 | | 4/2002 | Ellsworth et al. |
| 6,439,593 | B1 | | 8/2002 | Tseng |
| 6,450,520 | B1 | | 9/2002 | Girard |
| 6,471,230 | B2 | | 10/2002 | Ellsworth et al. |

(Continued)

FOREIGN PATENT DOCUMENTS

| | | |
|---|---|---|
| EP | 0723907 B1 | 7/1998 |
| EP | 0941917 A3 | 9/1999 |

(Continued)

*Primary Examiner* — Anne Marie Boehler
*Assistant Examiner* — Maurice Williams

(57) ABSTRACT

A bicycle rear wheel suspension system having a number of movable suspension links includes a pair of adjustable eccentric pivot assemblies that connect respective members of the movable linkage to the underlying fixed shape portion of the bicycle frame assembly. Each adjustable eccentric pivot assembly is preferably infinitely adjustable within a range of rotation of the respective pivot assembly relative to the underlying bicycle frame to manipulate an orientation of an axis of rotation of the respective movable link relative to the underlying bicycle frame assembly. The pair of adjustable eccentric pivot assemblies is coupled to one another in a manner that creates a dependency between the orientations of the respective eccentric pivot assemblies thereby providing various geometric configurations of the moveable members of the suspension system without changing the leverage ratio provided by the suspension system.

21 Claims, 7 Drawing Sheets

(56) References Cited

U.S. PATENT DOCUMENTS

| | | | |
|---|---|---|---|
| 6,488,301 B2 | 12/2002 | Klassen et al. | |
| 6,581,950 B1 | 6/2003 | Ellsworth | |
| 6,595,538 B2 | 7/2003 | Ellsworth et al. | |
| 6,712,374 B2 | 3/2004 | Assier | |
| 6,843,494 B2 | 1/2005 | Lam | |
| 6,845,998 B2 | 1/2005 | Probst | |
| 6,877,591 B1 * | 4/2005 | Hso | 188/321.11 |
| 6,886,846 B2 | 5/2005 | Carroll | |
| 6,926,298 B2 | 8/2005 | Ellsworth et al. | |
| 6,969,081 B2 | 11/2005 | Whyte | |
| 7,048,292 B2 | 5/2006 | Weagle | |
| RE39,159 E | 7/2006 | Klassen et al. | |
| 7,128,329 B2 | 10/2006 | Weagle | |
| 7,210,695 B2 * | 5/2007 | Griffiths | 280/283 |
| 7,216,883 B2 | 5/2007 | O'Connor | |
| 7,350,797 B2 | 4/2008 | Carroll | |
| 7,467,803 B2 | 12/2008 | Buckley | |
| 7,494,146 B2 | 2/2009 | Tseng | |
| 7,581,743 B2 | 9/2009 | Graney | |
| 7,712,757 B2 * | 5/2010 | Berthold | 280/284 |
| 7,722,072 B2 * | 5/2010 | Hoogendoorn | 280/284 |
| 7,815,207 B2 * | 10/2010 | Currie | 280/284 |
| 7,891,688 B2 | 2/2011 | Chamberlain | |
| 7,918,474 B2 * | 4/2011 | Waxham | 280/288 |
| 8,366,131 B2 * | 2/2013 | O'Connor | 280/284 |
| 8,376,382 B2 * | 2/2013 | Twers | 280/283 |
| 8,382,136 B2 * | 2/2013 | Beale et al. | 280/284 |
| 2006/0071442 A1 | 4/2006 | Hoogendoorn | |
| 2006/0071444 A1 * | 4/2006 | Griffiths | 280/283 |
| 2006/0119070 A1 | 6/2006 | Weagle | |
| 2006/0225942 A1 | 10/2006 | Weagle | |
| 2007/0024022 A1 | 2/2007 | Weagle | |
| 2007/0235986 A1 | 10/2007 | Weagle | |
| 2008/0067772 A1 | 3/2008 | Weagle | |
| 2008/0073868 A1 | 3/2008 | Weagle | |
| 2009/0001686 A1 * | 1/2009 | Currie | 280/285 |
| 2009/0315296 A1 * | 12/2009 | Berthold | 280/284 |
| 2010/0213685 A1 * | 8/2010 | Waxham | 280/284 |
| 2010/0244402 A1 * | 9/2010 | Hoogendoorn | 280/284 |
| 2011/0233892 A1 * | 9/2011 | Domahidy | 280/284 |
| 2011/0291382 A1 * | 12/2011 | Plantet | 280/284 |
| 2012/0056401 A1 * | 3/2012 | Beale et al. | 280/284 |
| 2012/0126506 A1 * | 5/2012 | Zawistowski | 280/275 |

FOREIGN PATENT DOCUMENTS

| | | |
|---|---|---|
| EP | 0913322 A3 | 10/2000 |
| WO | WO 95/29838 | 11/1995 |
| WO | WO 01/03958 | 1/2001 |
| WO | WO 03/010042 | 2/2003 |
| WO | WO 2006/016195 | 2/2006 |
| WO | WO 2006/032052 A2 | 3/2006 |
| WO | WO 2006/032052 A3 | 3/2006 |

\* cited by examiner

ADJUSTABLE GEOMETRY BICYCLE REAR WHEEL SUSPENSION SYSTEM

BACKGROUND OF THE INVENTION

The present invention relates generally to bicycles and, more particularly, to a suspension system for a rear wheel of the bicycle with an adjustable suspension geometry that maintains a desired leverage ratio regardless of the geometric orientation of the suspension relative to a fixed shape of the bicycle frame.

The primary structural component of a conventional two-wheel bicycle is the frame. On a conventional road bicycle, the frame is typically constructed from a set of tubular members assembled together to form a fixed shape frame. For many bicycles, the frame is constructed from members commonly referred to as the top tube, down tube, seat tube, seat stays and chain stays, and those members are joined together at intersections commonly referred to as the head tube, seat post, bottom bracket and rear dropout. The top tube usually extends from the head tube rearward toward the seat tube. The head tube, sometimes referred to as the neck, is a short tubular structural member at the upper forward portion of the bicycle which supports the handlebar and front steering fork, which supports the front wheel. The down tube usually extends downwardly and rearward from the head tube toward the bottom bracket, the bottom bracket usually comprising a cylindrical member for supporting the pedals and flexible drive mechanism which from the drive train for powering the bicycle. The seat tube usually extends upward from the bottom bracket and is joined to a rear end of the top tube. The seat tube also usually functions to telescopically receive a seat post for supporting a seat or saddle for the bicycle rider to sit on.

The chain stays normally extend rearward from the bottom bracket. The seat stays normally extend downwardly and rearward from a location proximate a top of the seat tube. The chain stays and seat stays are normally joined together with a rear dropout for supporting the rear axle of the rear wheel. The portion of the frame defined by the head tube, seat post and bottom bracket and the structural members that join those three items together can be referred to as the main front triangular portion or a forward portion of the bicycle frame, with the seat stays and chain stays defining a rear triangular portion of the frame that is offset from the forward portion of the frame for supporting a rear wheel relative thereto. The foregoing description represents the construction of a conventional bicycle frame which generally does not possess a suspension system having any shock absorbing characteristics.

The increased popularity in recent years of off-road cycling, particularly on mountains and/or cross-country trails, has made a shock absorbing system in many instances a biking necessity. A bicycle with a properly designed suspension system is capable of traveling over extremely bumpy, uneven terrain and up or down very steep inclines. Suspension bicycles are less punishing, reduce fatigue and reduce the likelihood of injury to the rider, and are much more comfortable to ride over uneven terrain as compared to bicycles having what is commonly termed a fixed shape bicycle frame. For off-road cycling in particular, a suspension system greatly increases the rider's ability to control the bicycle because the wheels remain in contact with the ground as they ride over rocks and bumps in the terrain instead of being bounced into the air as occurs on conventional non-suspension bicycles.

Over the last several years the number of bicycles equipped with suspension systems has dramatically increased. In fact, many bicycles are now fully suspended, meaning that the bicycle has both a front wheel suspension system and a rear wheel suspension system. Front wheel suspensions were the first to become popular. Designed to mitigate the pounding associated with the bicycle front end, the front suspension is simpler to implement than a rear suspension. A front suspension fork is easy to retrofit onto older, fixed shape bicycle frame assemblies. On the other hand, rear suspension system increase traction and assist in cornering and balance the ride and do so particularly well over very uneven terrain.

During cycling, as the bicycle moves along a desired path, discontinuities of the terrain are communicated to the assembly of the bicycle and bicycle frame and ultimately to the rider. Although such discontinuities are generally negligible for cyclists operating on paved surfaces, riders venturing from the beaten path frequently encounter such terrain. With the proliferation of mountain biking, many riders seek the more treacherous trail. Technology has developed to assist such adventurous riders in conquering the road less traveled. Wheel suspension systems are one such feature.

Riding a fully suspended mountain bike along a rough, rock strewn trail, or even level riding on city and country roads, provides a new degree of comfort and capability to the rider. It is in downhill riding and racing that a rear suspension is most beneficial, but even on ordinary city and country roads, a rear suspension allows the rider to maintain a forward facing orientation to more safely view traffic and road conditions without paying disproportionate attention to stones and potholes immediately below in the rider's path.

A number of pivoting link suspensions have been developed for rear wheel suspensions on bicycles. In its simplest configuration, the chain stays, which on a conventional bicycle frame are rigidly mounted, are replaced by a pair of swing arms that are pivotably attached at their front ends to the generally fixed shape front triangular portion of the frame. The pivot is usually located near the bottom bracket where the pedal and crank are supported. The rear ends of the swing arms, which support the rear axle, move upward and downward in response to the rear wheel striking rocks, curbs and other obstructions. The range of movement of the swing arm usually is controlled by a shock, dampener, or shock absorber affixed between the swing arm and the main front frame portion and/or other members of the moveable rear wheel suspension linkage. Although such systems have allowed riders to conquer more aggressive terrain, room for improvement still exists.

Many riders appreciate that braking on mountain bikes can feel "chattery", or as though the wheel is skipping over the terrain rather than rolling thereover. This chatter can detract from rider comfort and confidence as well as adversely affect bicycle performance. During normal operation, as the wheel moves across the ground, a contact patch of the tire is defined as the area of the tire that engages the ground surface. During translation of the suspension system relative to the frame, the contact patch rotates about the tire relative to an axis of rotation of the tire. Typically, the contact patch rotates 10 to 23 degrees for bikes having a suspension which travel ranging from about 122 to approximately 180 millimeters. Other suspension systems provide contact patch rotation in the range of 7 to 12 degrees for bicycles having 120 to 250 millimeters of suspension travel. Rotation of the contact patch contributes to the operational chatter perceived by the rider.

Braking forces as well as the relative orientation of the respective moveable links of the suspension system relative to each other and the underlying bicycle frame assembly also affect operation of the suspension system. With respect to the braking forces, the braking forces can cause the suspension system to compress or extend based, in part, on the orientation of the brake system with respect to the movable links of the suspension, and/or the orientation of the brake support relative to the fixed shape portion of the frame assembly constructed to support the rider, and/or the relative orientation of each of the moveable links relative to one another and/or relative the underlying fixed shaped frame portion of the bicycle assembly. Improper association of the brake system with the rear wheel and/or the movable members of the suspension system can detrimentally affect bicycle performance as well as stopping ability.

During braking, rider momentum generates a forward weight shift which acts to compress the front suspension while extending the rear suspension. The extension of the rear suspension system un-weights the rear wheel and tends to reduce rear tire traction. The reduction in rear tire traction adversely affects braking power in that, if the rear tire traction is sufficiently reduced, the rear tire may be allowed to slide along the ground surface. Such an event can distract a rider and may adversely affect the rider's ability to maintain control of the bicycle.

As alluded to above, suspension performance and rider comfort are also dependant on the orientation of the various movable links of the suspension system relative to each other and relative to the underlying fixed shape portion of the bicycle frame assembly. One parameter commonly considered during suspension system linkage design is the leverage ratio associated with the various discrete members of the linkage. Leverage ratio is a ratio that associates a movement experienced at a bicycle's rear axle to the movement experienced at a bicycle's suspension dampener, dampener, damper, or shock absorber. The leverage ratio is commonly graphically represented as a plot of instant leverage ratio vs. rear wheel travel wherein the instant leverage ratio is determined as the change in rear wheel travel divided by the change in dampener length. Suspension designers spend considerable time tuning this ratio to specific needs and performance requirements to satisfy various rider demands.

Commonly, adjustable geometry full suspension bicycles are designed to be somewhat adjustable so that riders can tune a suspension to provide a desired ride response. Unfortunately, those designs that provide adjustable geometry suspension systems result in undesired changes to the leverage ratio when the geometry of the suspension system is manipulated. That is, adjusting the relative position of the various links of the suspension relative to one another and/or the underlying bicycle frame assembly creates a deviation in the leverage ratio from a desired value associated with only the most common geometrical configuration of the suspension system. The manipulation of the geometry of such suspension systems detrimentally affects the leverage ratio such that the adjusted geometry provides less than desirable acceleration and deceleration response with respect to braking and contact patch response performance.

Accordingly, it is desired to provide an adjustable bicycle wheel suspension system that is geometrically adjustable but maintains a desired leverage ratio regardless of the relative orientation of the suspension system.

BRIEF DESCRIPTION OF THE INVENTION

The present invention provides a frame assembly and suspension system that overcomes the aforementioned drawbacks. According to one aspect of the invention, a bicycle wheel suspension system having a number of movable suspension links includes a pair of adjustable eccentric pivot assemblies that connect respective members of the movable linkage to the underlying bicycle frame. Each adjustable eccentric pivot assembly is preferably infinitely adjustable within a range of rotation of the respective pivot assembly relative to the underlying bicycle frame to manipulate an orientation of an axis of rotation of the respective link relative to the underlying bicycle frame assembly. The pair of adjustable eccentric pivot assemblies are coupled to one another in a manner that creates a dependency between the position of the first eccentric pivot assembly and the second eccentric pivot assembly to provide a desired range of operation of the suspension system and prevent an undesired relative positioning of respective links relative to one another and relative to the underlying bicycle frame assembly to maintain a desired leverage ratio regardless of the geometric configuration of the suspension system.

Another aspect of the invention that is useable with one or more of the above features discloses a bicycle frame assembly having a forward frame portion for supporting a rider. A rear wheel support assembly is connected to the forward frame portion and is movable to allow translation of a rear wheel relative to the forward frame portion. A first pivot assembly and a second pivot assembly connect the rear wheel support assembly to the forward frame portion. Each of the first pivot assembly and the second pivot assembly are adjustable relative to the forward frame portion such that a pivot axis associated with each of the first pivot assembly and the second pivot assembly is individually infinitely eccentrically adjustable with respect to an orientation of the respective pivot assembly relative to the forward frame portion. The frame assembly includes a coupler that creates a dependency between the orientation of the first pivot assembly and the second pivot assembly relative to the forward frame portion.

Another aspect of invention useable with one or more of the above aspects discloses a bicycle frame assembly having a first frame portion that supports a crankset. A rear wheel support assembly, having a seat stay and a chain stay, is movable relative to the first frame portion. The assembly includes a rear wheel that rotatably cooperates with the rear wheel support assembly. A first pivot assembly and a second pivot assembly that are offset from one another each pivotably connect the rear wheel support assembly to the first frame portion. Each of the first pivot assembly and the second pivot assembly are rotatable about a pivot mount axis and define a respective link pivot axis that is offset from the respective pivot mount axis.

Another aspect of the invention that is combinable with one or more of the features or aspects disclosed above discloses a method of forming a bicycle suspension with a manipulatable suspension performance. The method includes connecting a first movable linkage member to a bicycle frame member with a first eccentric pivot assembly that is adjustable without removing the first eccentric pivot assembly from a bicycle assembly and connecting a second moveable linkage member to the bicycle frame with a second eccentric pivot assembly that is adjustable without removing the second eccentric pivot assembly from the bicycle assembly. The first pivot assembly to the second pivot assembly are coupled to one another such that an orientation of the first eccentric pivot assembly is dependent on an orientation of the second eccentric pivot assembly relative to the bicycle assembly and forms a path that is separate from paths associated with movable members of the bicycle suspension.

These and various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
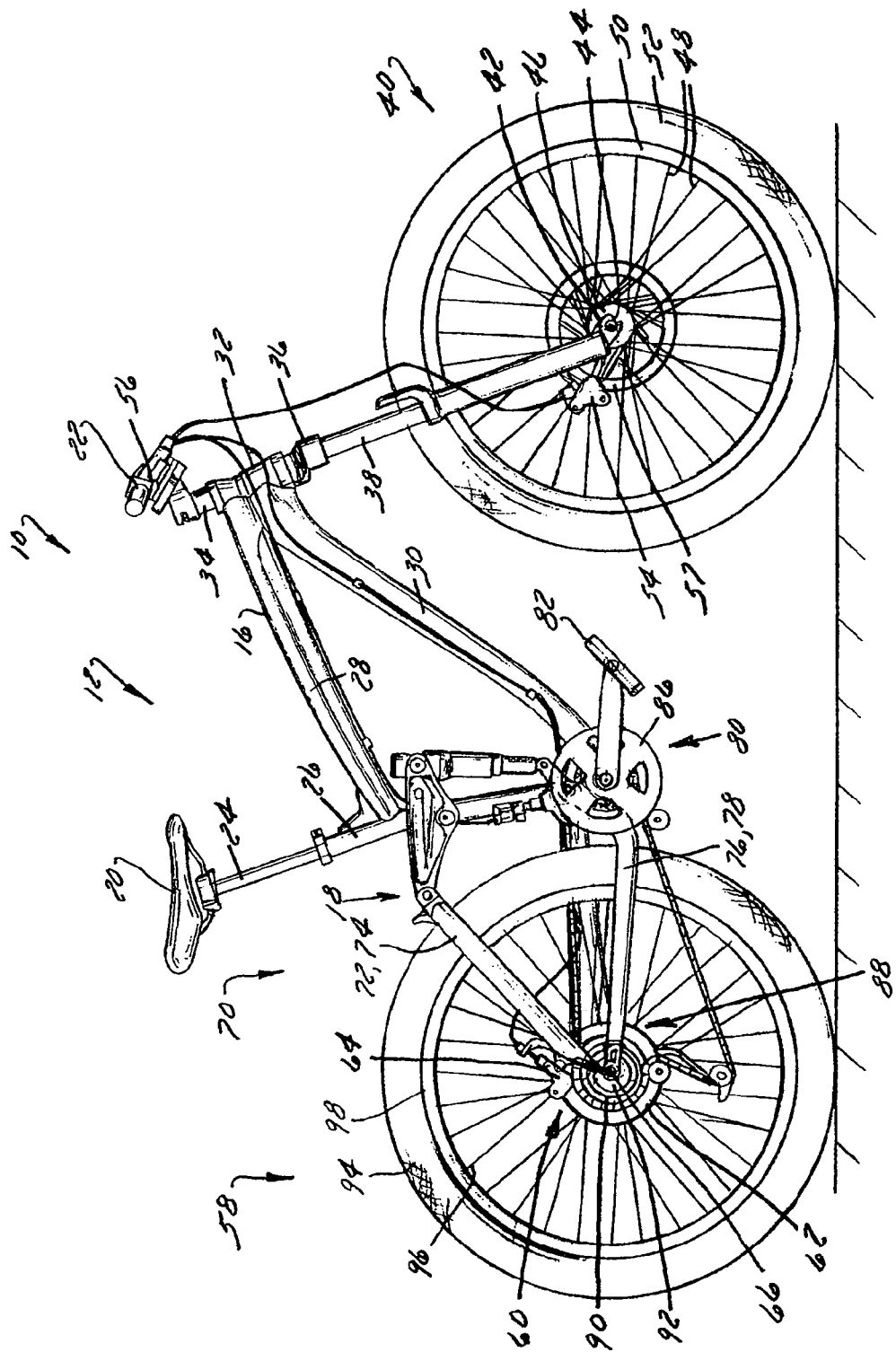
FIG. 1 is an elevational view of a bicycle equipped with a frame and suspension system according to the present invention.

FIG. 1 shows a bicycle 10 having a frame assembly 12 equipped with a suspension system 14 according to the present invention. As used herein, bicycle frame assembly 12 includes a fixed shape frame assembly or portion 16 and a suspension frame assembly or portion 18 that includes a number of connected links that are connected to fixed shape frame portion 16. Said in another way, the suspension dampening portion of frame assembly 12 includes a number of movable links that are pivotably or otherwise moveably connected to fixed shape frame portion 16 which is generally positioned more directly under a rider of bicycle 10. Although fixed shape frame portion 16 has a rigid, generally triangular shape, it is appreciated that frame portion 16 could be formed in a number of shapes.

Bicycle 10 includes a seat 20 and handlebars 22 that are attached to frame assembly 12. A seat post 24 is connected to seat 20 and slidably engages a seat tube 26 of frame assembly 12. Seat 20 and handlebars 22 adjustably cooperate with frame portion 16 to extend a desired distance there above. A top tube 28 and a down tube 30 extend forward from seat tube 26 to a head tube 32 of frame assembly 12. Handlebars 22 are connected to a stem 34 that passes through head tube 32 and engages a fork crown 36. A pair of forks 38 extend from generally opposite ends of fork crown 36 and are constructed to support a front wheel assembly 40 at an end of each fork or a fork tip 42. Fork tips 42 engage generally opposite sides of an axle 44 that is constructed to engage a hub 46 of front wheel assembly 40. A number of spokes 48 extend from hub 46 to a rim 50 of front wheel assembly 40. A tire 52 is engaged with rim 50 such that rotation of tire 52, relative to forks 38, rotates rim 50, spokes 48, and hub 46.

Bicycle 10 includes a front brake assembly 54 having an actuator 56 attached to handlebars 22 and a pair of brake pads that are positioned on generally opposite sides of a disk 57 associated with hub 46 of front wheel assembly 40. Alternatively, bicycle 10 could be provided with a rim brake assembly having brake pads that are constructed to engage a brake wall of rim 50, commonly termed a rim brake as compared to the disk brake system shown in FIG. 1 associated with front wheel assembly 40. Regardless of the specific configuration, front brake assembly 54 provides a stopping or slowing force to front wheel assembly 40.

Still referring to FIG. 1, suspension frame portion 18 connects a rear wheel assembly 58 to fixed frame portion 16 such that rear wheel assembly 58 is supported by suspension frame portion 18 but is movable relative to fixed frame portion 16 during use of bicycle 10. A disc brake assembly 60 having a rotor 62 and a caliper 64 are positioned proximate a rear wheel axle 66 that rotationally secures rear wheel assembly 58 to suspension frame portion 18. A rear wheel 68 is positioned generally concentrically about rear wheel axle 66. Understandably, rear wheel assembly 58, like front wheel assembly 40, could each alternatively be equipped with a rim brake system and/or each of front and rear wheel assemblies 40, 58 could be configured for operation with alternate disk and/or rim brake assemblies.

A rear wheel suspension system 70 includes suspension frame portion 18 and pivotably connects rear wheel assembly 58 to the fixed shape forward frame portion 16 of bicycle frame assembly 12. Rear wheel suspension system 70, and the movable portions of frame assembly 12, allows rear wheel 68 to move relative to fixed frame portion 16 independent of seat 20 and handlebars 22 during use of bicycle 10. Suspension frame portion 18 of suspension system 70 includes a number of movable links, including one or more seat stays 72, 74, and one or more chain stays 76, 78 that offset rear wheel axle 66 from a crankset 80. As explained further below, suspension system 70 includes a number of eccentric pivots that pivotably connect discrete elements or members of suspension frame portion 18 to fixed frame portion 16. As explained further below, suspension system 70 includes a shock, shock absorber, damper, or dampener that dampens movement of suspension frame portion 18 relative to fixed frame portion 16 during use of bicycle 10.

Crankset 80 includes a pair of pedals 82 that is operationally connected to a flexible drive member such as a belt or a chain 84 via a chain ring or sprocket 86. Rotation of chain 84 communicates a drive force to a rear section 88 of bicycle 10. A gear cluster 90 is positioned at rear section 88 and engaged with chain 84. Gear cluster 90 is generally concentrically orientated with respect to rear wheel axle 66 and includes a number of variable diameter gears. Gear cluster 90 is operationally connected to a hub 92 of rear wheel assembly 58. A number of spokes 96 extend radially between hub 92 and a rim 98 associated with a rear tire 94 of rear wheel assembly 58. Rear wheel axle 66 rotationally connects rear wheel assembly 58 to suspension frame portion 18 of bicycle frame assembly 12. As is commonly understood, rider operation of pedals 82 drives chain 84 thereby driving rear tire 94 which in turn propels bicycle 10.

Figure 2:
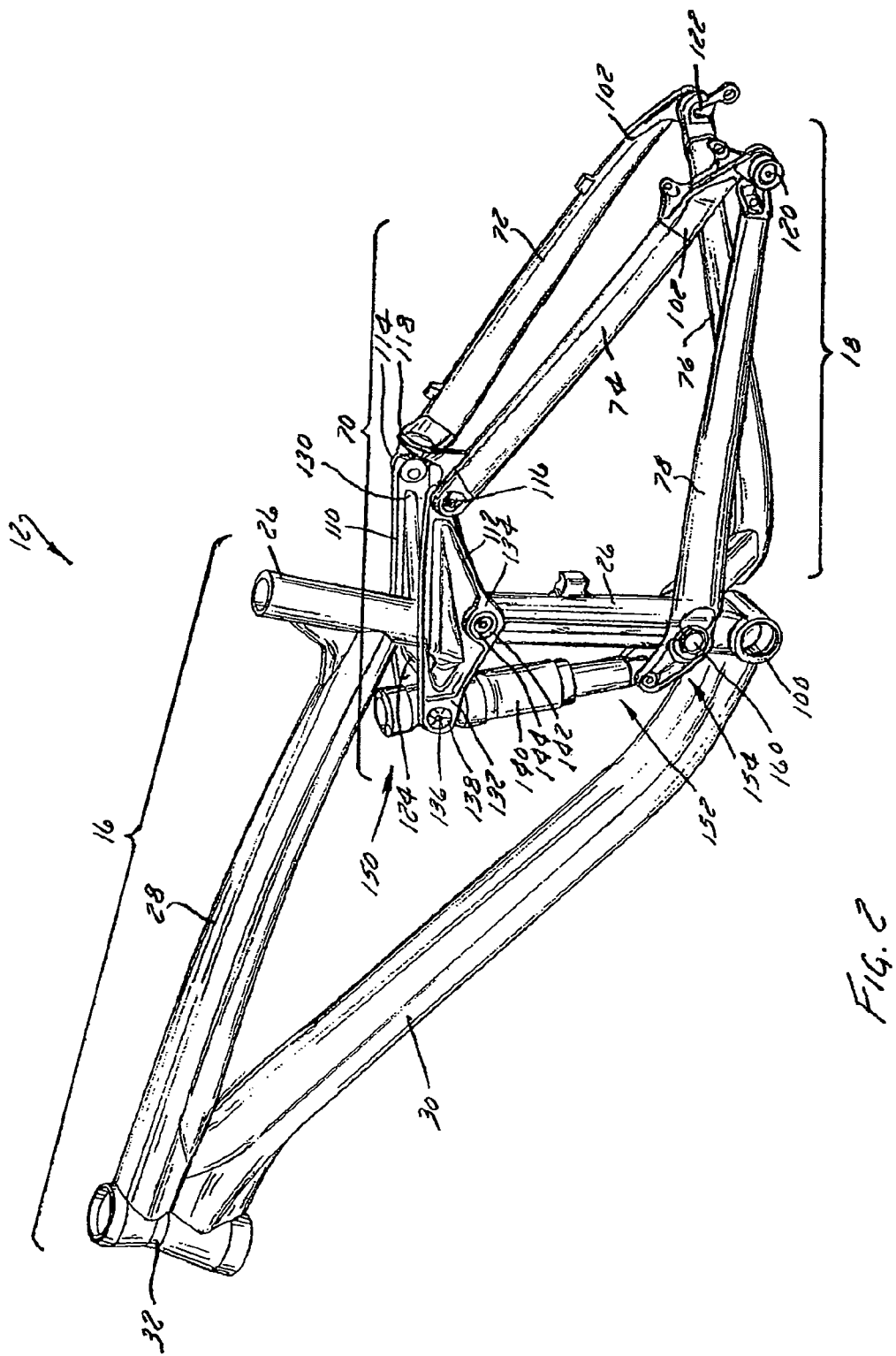
FIG. 2 is a perspective view of the frame and suspension system shown in FIG. 1.

FIG. 2 shows frame assembly 12, which includes frame portion 16 and suspension frame portion 18, with the auxiliary bicycle forming structures, such as seat 20, handlebars 22, steering assembly, wheel assemblies 40, 58, and the drive train system removed therefrom. A bottom bracket 100 is formed proximate the interface of seat tube 26 and down tube 30 and is constructed to operatively connect crankset 80 (FIG. 1) to bicycle frame assembly 12. Although bottom bracket 100 is shown at a lower most and rearward most intersection of seat tube 26 and down tube 30, it is appreciated that the interaction of crankset 80 with frame portion 16 could be offset in an upward direction along seat tube 26 and/or in a forward direction along down tube 30.

Figure 3:
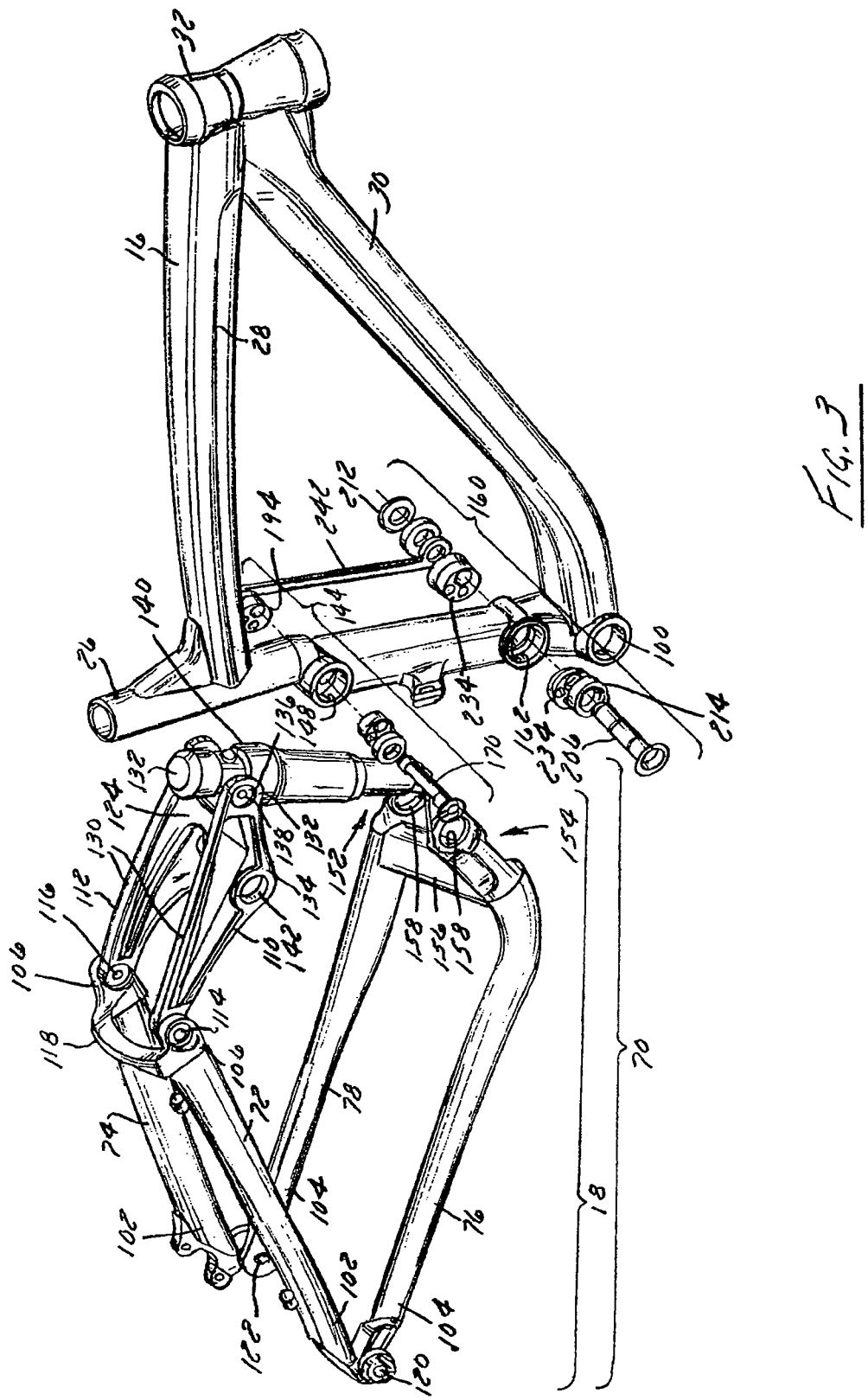
FIG. 3 is a perspective partial exploded view of the bicycle frame and suspension system shown in FIG. 2.

Referring to FIGS. 2 and 3, seat stays 72, 74 each include a first end 102 that is pivotably connected to a first end 104 of a respective chain stay 76, 78. A second end 106 of each seat stay 72, 74 is pivotably connected to a respective rocker arm 110, 112. A pivot pin 114, 116 provides the pivotable connection between seat stays 72, 74 and rocker arms 110, 112. An optional web wall 118 extends between seat stay 72, 74 proximate pivot pins 114, 116. A pivot assembly 120, 122 provides the pivotable connection between seat stays 72, 74 and a respective chain stay 76, 78. Preferably, pivot assemblies 120, 122 are concentrically oriented with respect to an axis of rotation of rear wheel assembly 58 supported by suspension frame portion 18. Regardless of the configuration of pivots 120, 122, seat stays 72, 74 and chain stays 76, 78 are rotatable relative to one another via pivots 120, 122 and rotatable or otherwise moveable relative to fixed shape frame portion 16 of bicycle 10.

Rocker arms 110, 112 are also connected via an optional web wall 124 that extends laterally between the adjacent rocker arms 110, 112. Each rocker arm has a generally triangular shape and includes a first or rear lobe 130, a second or forward lobe 132, and a third or intermediary lobe 134. Forward lobe 132 includes a pivot opening 136 that rotationally cooperates with a pivot pin 138 that pivotably secures rocker arm 110, 112 to a shock absorber, shock, damper or dampener 140. Each intermediary lobe 134 includes a pivot opening 142 that is constructed to cooperate with a first eccentric pivot assembly 144 that rotationally cooperates with a first or upper pivot opening 148 formed in seat tube 26. As explained further below, opening 142 of rocker arms 110, 112 is concentrically rotatable about a pivot pin that is eccentrically oriented relative to an axis of rotation of the eccentric pivot pin assembly 144 relative to the interaction of the pivot pin assembly 144 with seat tube 26.

Rocker arms 110, 112 are pivotably connected to a first end 150 of dampener 140. A second end 152 of dampener 140 pivotably cooperates with a forward facing end 154 of chain stays 76, 78. A web wall 156 extends between the forward facing ends 154 of chain stays 76, 78. A pivot opening 158 is formed in ends 154 of chain stays 76, 78 at a position generally forward of web wall 156. Each pivot opening 158 rotatably cooperates with a second or lower eccentric pivot assembly 160 that rotatably cooperates with a second or lower pivot opening 162 formed in seat tube 26. Lower pivot opening 162 is located generally below upper pivot opening 148. Pivot openings 148 and 162 are formed in seat tube 26 and eccentric pivot assemblies 144, 160 pivotably cooperate with seat tube 26, arms 110, 112 and chain stays 76, 78 to connect rear suspension frame portion 18 to fixed shape frame portion 16.

As described above, it is appreciated that each of seat stays 72, 74 chain stays 76, 78 and rocker arms 110, 112 define the various movable links of rear wheel suspension frame portion 18 is much as the links move relative to one another and relative to fixed shape frame portion 16 during use of bicycle 10. It is further appreciated that although each of seat stays, chain stays and rocker arms include a respective web wall 118, 124, 156, the individual stays and/or arms can be configured so as to omit the respective optional web walls.

It is further appreciated that although dampener 140 is shown as being positioned generally forward of seat tube 26, dampener 140 could be positioned rearward of seat tube 26, oriented to cooperate with one or more of seat stays 72, 74, chain stay 76, 78, and/or rocker arms 110, 112. It is further appreciated that although dampener 140 is shown in what is commonly referred to as a "free-floater" configuration, inasmuch as both ends of dampener 140 are secured to a respective movable members of suspension frame portion 18, dampener 140 and suspension system 70 could be provided in a "single-floater" configuration wherein one end of dampener 140 is secured to fixed shape frame portion 16 and another end of the dampener cooperates with any one of the movable links or members of suspension frame portion 18. It is further appreciated that dampener 140 could be oriented in orientations other than that shown such as being generally horizontally oriented, horizontally oriented in close proximity to top tube 28 of frame portion 16, and/or extend in a generally forward direction so as to interact with down tube 30 of bicycle 10. Regardless of the specific orientation of dampener 140, the particular number and/or orientation of the movable members of the suspension frame portion 18 of suspension system 70, and/or the interaction between dampener 140 and the movable and fixed members of the frame assembly 12, dampener 140 resists and/or suppress motion of the suspension frame portion 18 relative to the fixed shape frame portion 16.

Figure 4:
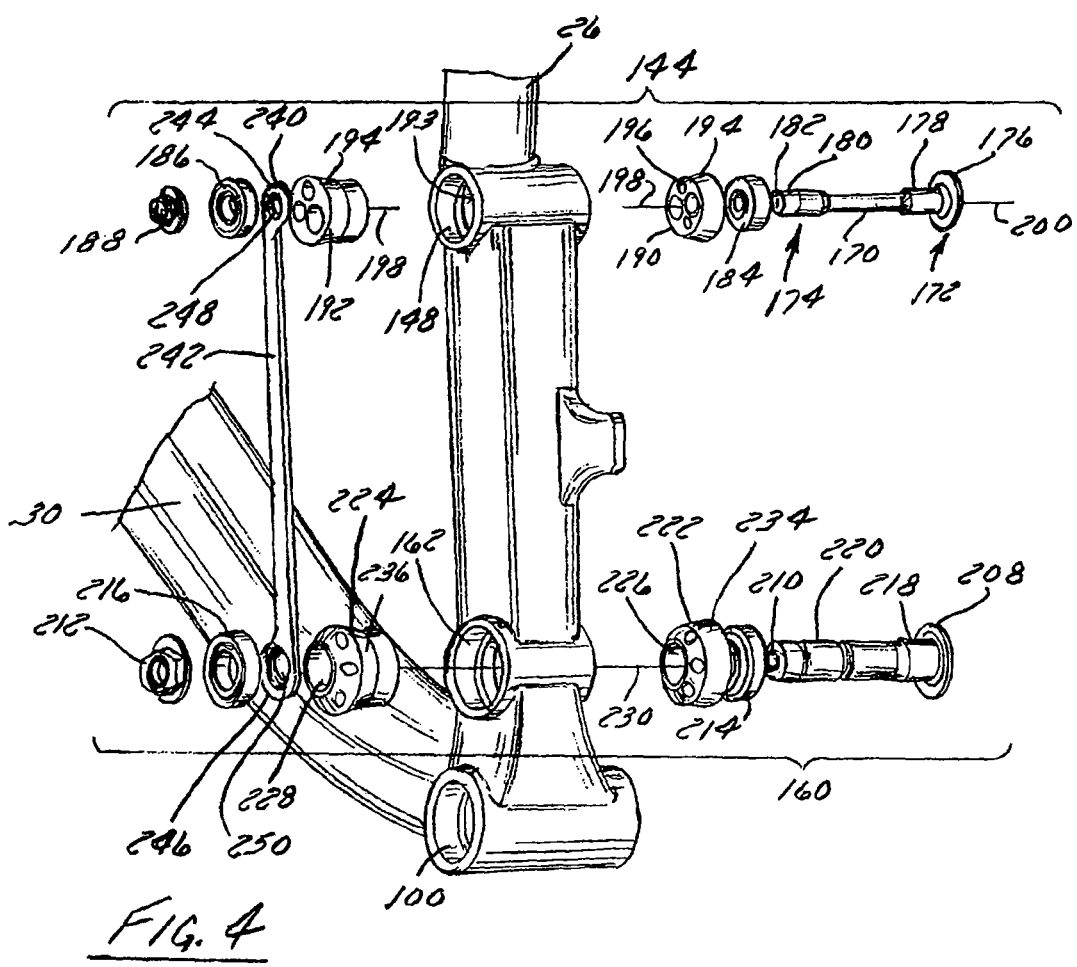
FIG. 4 is perspective exploded view of a portion of the frame and a pair of eccentric pivot assemblies exploded therefrom.
Figure 5:
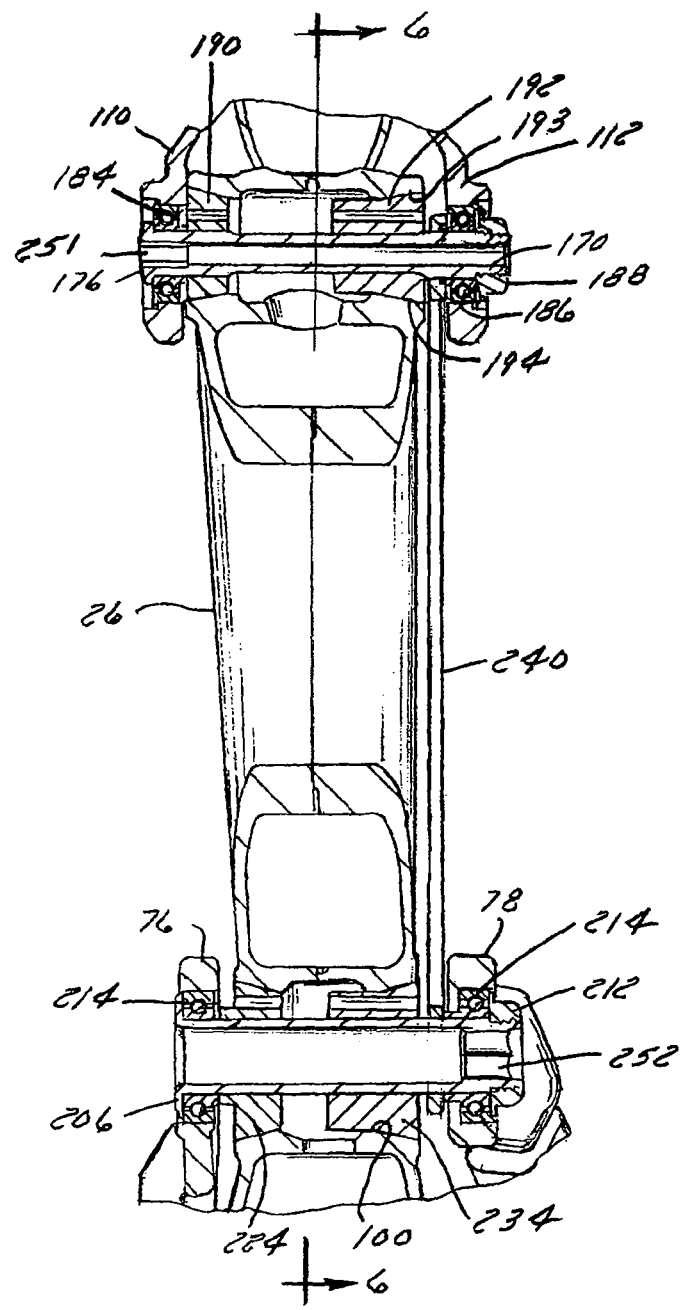
FIG. 5 is a cross-sectional view of the frame and suspension system taken along line 5-5 shown in FIG. 6 which extends through the center line axis of the pivot pin associated with each pivot pin.

Referring to FIGS. 4 and 5, pivot assembly 144 includes a pivot pin 170 having a first end 172 and a second end 174. A head portion or head 176 is formed approximate first end 172 of pivot pin 170. A first bearing portion or surface 178 is formed inboard of head 176. A second bearing portion or surface 180 is formed approximate second end 174 of pivot pin 170. A threaded recess or threaded portion 182 is formed along a portion of pivot pin 170 proximate second end 174 of pivot pin 170. A first bearing 184 and a second bearing 186 are shaped to slidably cooperate with bearing surfaces 178, 180 of pivot pin 170 at locations laterally outboard of opening 148. A fastener such as a nut 188, or a bolt when pin 170 is provided with a threaded recess, is operatively cooperates with threaded portion 182 of pivot pin 170.

A first mount body 190 and a second mount body 192 slidably cooperate with pivot pin 170 and are positioned laterally inboard relative to bearings 184, 186. Each mount body 190, 192 includes an outer surface 194 and one or more openings 196 that are offset or eccentrically oriented with respect to a longitudinal centerline, indicated by line 198, of the respective mount body 190, 192. Openings 196 are constructed to slidably cooperate with pivot pin 170 such that the longitudinal axis of pivot pin 170, indicated by line 200, is offset or eccentrically oriented with respect to centerline 198 of mount bodies 190, 192. The radially outward directed outer surface 194 of mount bodies 190, 192 is shaped to slidably cooperate with pivot opening 148 formed in seat tube 26 along axis 198. Preferably, a radially inward oriented surface 193 of opening 148 and surfaces 194 of mount bodies 190, 192 have corresponding, preferably frustoconical shapes such that, upon tightening of nut 188 along pivot pin 170, mount bodies 190, 192 are compressed or wedged within pivot opening 148 of seat tube 26 so as to positionally fix the respective mount bodies 190, 192 and pivot pin 170 relative to seat tube 26 and such that axis 200 of pivot pin 170 is secured at an eccentric position or a position that is offset relative to the longitudinal centerline axis associated with opening 148 which is aligned with centerline axis 198 of mount bodies 190, 192. Understandably, such a frustoconical association is merely exemplarily of one shape that provides a rotation but securable interaction between the mount bodies and the corresponding respective opening formed in seat tube 26. Bearings 184, 186 are shaped to rotatably cooperate with openings 142 formed in arms 110, 112 of suspension system 70 at positions that are outboard laterally adjacent to opening 148 of seat tube 26.

Lower pivot assembly 160 has a construction that is generally similar to or the same as pivot assembly 144. Pivot assembly 160 includes a pivot pin 206 having a head portion 208 and an internally or externally threaded end portion 210 that is constructed to operatively engage a fastener such as a bold or a nut 212. Understandably, it is envisioned that pin 206 could be provided with an internally threaded fastener such that fastener nut 212 could be provided as a bolt rather than a nut. Pivot assembly 160 includes a first bearing 214 and a second bearing 216 that rotationally cooperate with respective seat 218, 220 defined by pivot pin 206 so as to rotatably support one of chain stays 76, 78 when suspension system 70 is fully assembled.

Pivot assembly 160 includes a first mount body 222 and a second mount body 224 that are positioned laterally inboard relative to bearings 214, 216. Each mount body 222, 224 includes a pivot pin opening 226, 228 that is eccentrically oriented or radially offset from a longitudinal centerline, indicated by line 230, associated with pivot opening 162 formed in seat tube 26. The radially directed outer external surface 234, 236 of each mount body 222, 224 is shaped to slidably cooperate with pivot opening 162 such that the mount bodies 222, 224 can be compressed in the pivot opening 162 during tightening of the pivot assembly 160. Preferably, surfaces 234, 236 of mount bodies 222, 224 each have a generally frustoconical shape such that secure engagement of nut 212 with pivot pin 206 compresses mount bodies 222, 224 into the volume defined by pivot opening 162 in seat tube 26 and compress about pivot pin 206. Preferably, pivot pin 206 and nut 212 are configured to cooperate with one another in a manner wherein, when loose but still connected, the radial orientation of pivot pin 206 relative to the centerline of opening 162 can be adjusted without full disassembly of pivot assembly 160 and while mount bodies 222, 224 are loosely engaged with opening 162.

Bearings 214, 216 are constructed to rotatably cooperate with the pivot openings 158 formed in forward positioned ends 154 of chain stays 76, 78. As shown in FIGS. 4-5, suspension system 70 includes a coupler 240 that operatively cooperates with pivot assembly 144 and pivot assembly 160. Coupler 240 includes an elongate body 242 having a first end 244 and a second end 246. A first opening 248 is formed in coupler 240 proximate first end 244 and a second opening 250 formed in coupler 240 proximate second end 246. Openings 248, 250 are constructed to rotatably cooperate with a respective pivot pin 170, 206 associated with each of the respective pivot assemblies 144, 160. As explained further below, coupler 240 forms a positional association or dependency between the orientation of pivot pin 170 and pivot pin 206 relative to seat tube 26.

Referring to FIG. 5, one or both of pivot pins 170, 206 and/or nuts 188, 212 preferably includes a driving interface 251, 252 that is shaped to receive a rotational driving tool, such as a hex wrench or the like, for manipulating the threadable engagement between the respective pivot pin and the corresponding nut. It is appreciated that driving interface 251, 252 may be on an internally or externally directed surface of nut 188, 212. As alluded to above, when tightened, pivot pin assemblies 144, 160 positionally fix the orientation of the pivot pins 170, 206 relative to seat tube 26 and thereby define the axis of rotation of the respective rocker arm 110, 112 or respective chain stay 76, 78 relative to seat tube 26 and also define the radial position of pivot mounts bodies 190, 192 and 222, 224 relative to the respective pivot opening 148, 162 formed in seat tube 26. The eccentric orientation of pivot pins 170, 206 relative to the respective axis of rotation of pivot pin mount bodies 190, 192 and 222, 224 yields an assembly wherein the axis of rotation of the respective link or suspension frame member relative to seat tube 26 can be manipulated by altering the orientation of the respective mount relative to the seat tube and preferably in a manner that only requires the loosening of the pivot assemblies rather than any disassembly or intermediate removal of any of the parts of the suspension and/or suspension mounting assemblies or constituent parts. Said in another way, it is appreciated that each of pivot assemblies 144, 160 can be manipulated without fully removing any of the pivotable connections between the respective movable and fixed links of bicycle frame assembly 12. It should further be appreciated that coupler 240, and its rotation cooperation with pivot pins 170, 206, creates a dependency between the relative orientation of one pivot assembly 144, 160 relative to the other pivot assembly 144, 160.

Figure 6:
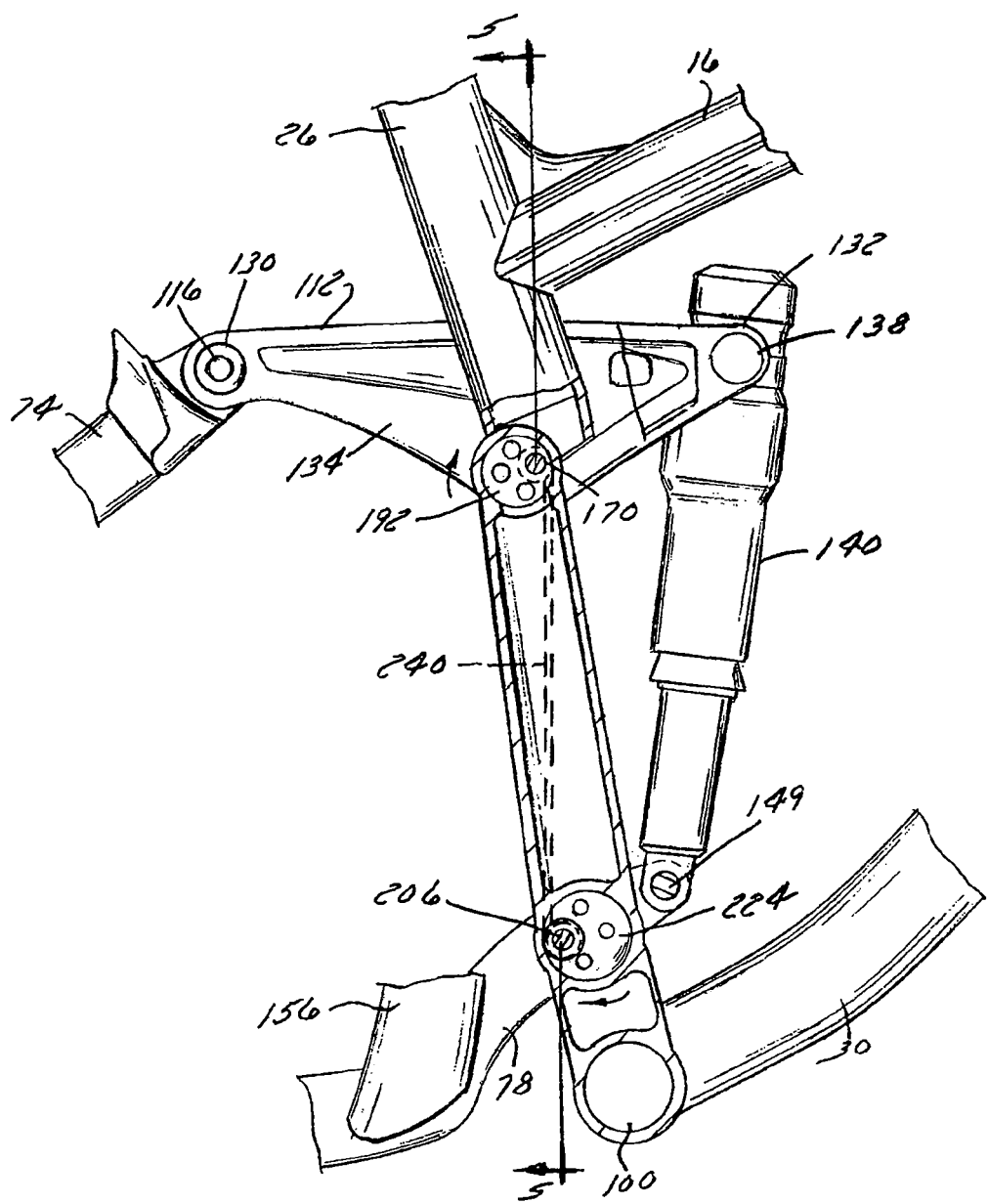
FIG. 6 is a cross-sectional view of the suspension assembly taken along line 6-6 shown in FIG. 5 with the pivot assemblies in a first orientation relative to the rigid portion of the frame assembly.
Figure 7:
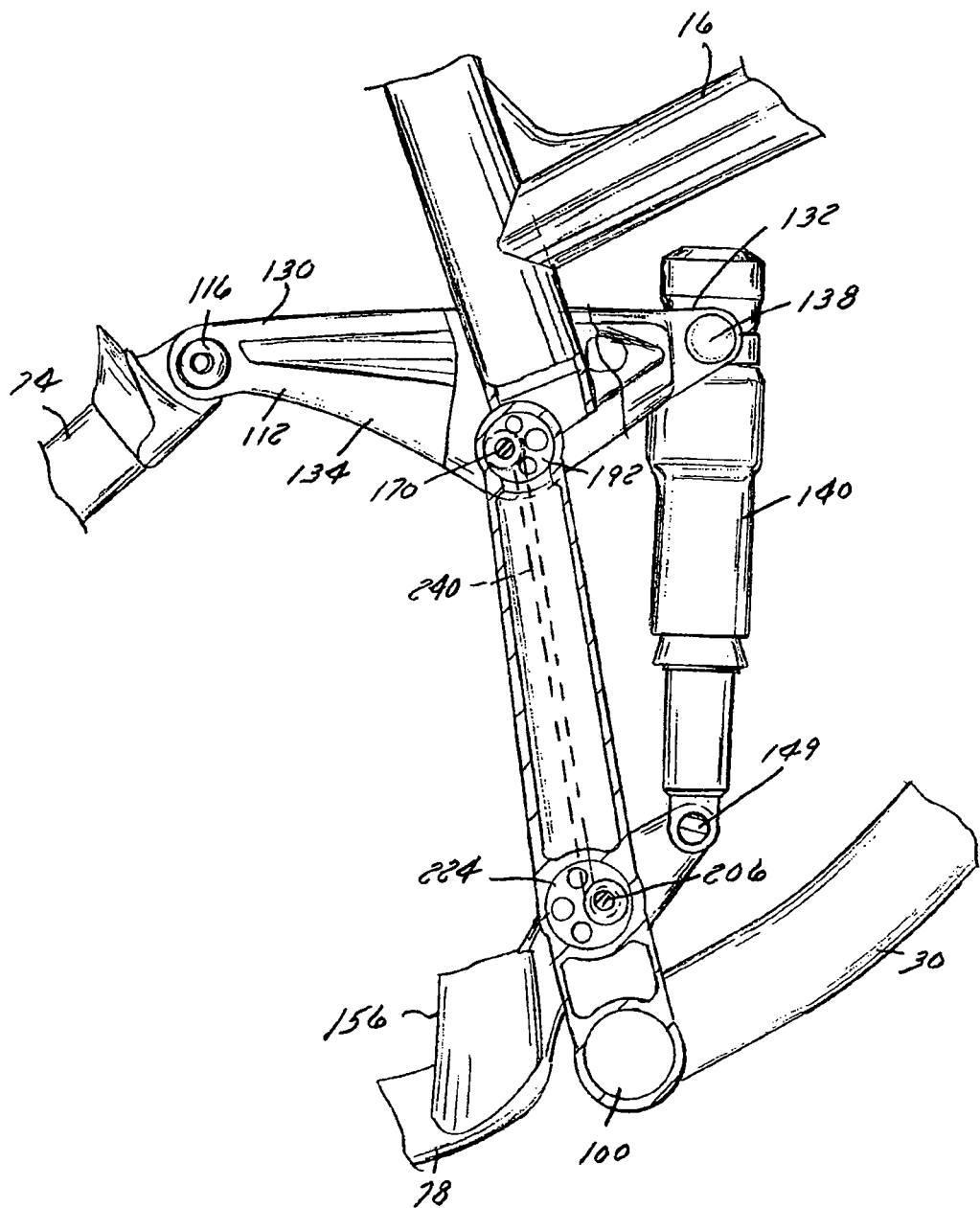
FIG. 7 is a view similar to FIG. 6 with the pivot assemblies in a second orientation relative to the orientation shown in FIG. 6.

Although FIGS. 6 and 7 show two discrete relative orientations of eccentric pivot assemblies 144, 160 relative to seat tube 26, it is appreciated that first pivot assembly 144 and second pivot assembly 160 are each infinitely positionable within a range of the rotation of the respect pivot assemblies. That is, each pivot assembly 144, 160 is rotatably positionable relative to seat tube 26 about a range of rotation of 360 degrees relative to the centerline axis associated with the respective opening formed in seat tube 26. That is, the range of rotation of pivot assemblies 144, 160 is 360 radial degrees relative to the respective pivot opening 148, 162 formed in seat tube 26. The eccentric cooperation of the respective pivot pin 170, 206 relative to the corresponding mount bodies alters the orientation of the respective pivot pin 170, 206 with respect to the seat tube 26 during rotation of the mount bodies relative to the seat tube 26 such that the orientation of pivot pins 170, 206 is infinitely adjustable relative to seat tube 26 within a range of rotation of the corresponding mount bodies.

Rocker arms 110, 112 have a range of pivotable interaction with seat tube 26 that is defined by the relative radial orientation of pivot assembly 144 relative to seat tube 26. Said in another way, rocker arms 110, 112 have an uppermost orientation, a lowermost orientation, a forward most orientation (as shown in FIG. 6), and a rearward most orientation (as shown in FIG. 7) relative to seat tube 26 as pivot assembly 144 is rotated relative thereto. Likewise, chain stays 76, 78 also have an upper most orientation, a lowermost orientation, a forward most orientation (as shown in FIG. 7), and a rearward most orientation (as shown in FIG. 6) relative to seat tube 26 as pivot assembly 160 is rotated relative thereto. Although shown in only two geometric configurations, as explained above, it is appreciated that the geometric orientation of rocker arms 110, 112 and chain stays 76, 78 is infinitely adjustable relative to seat tube 26 as a function of the rotational orientation of pivot assemblies 144, 160 relative to seat tube 26.

Coupler 240 defines a relative positional interaction or dependency between the position of first pivot assembly 144 and the position of second pivot assembly 160 such that, regardless of the specific geometric orientation of the movable links of suspension system 70 relative to fixed shape frame portion 16, the position of each pivot assembly 144, 160 is dependant on the position of the other pivot assembly 144, 160. Such a construction allows suspension system 70 to operate at a desired leverage ratio regardless of the specific geometric configuration of the moveable linkage members relative to the underlying fixed shape linkage members. The adjustable geometric configuration of suspension system 70 and it's interaction with fixed shape frame portion 16 allows the user to adjust the chainpull, or the force a bicycle's suspension linkage generates to oppose the natural tendency of a bike's rear suspension to compress due to acceleration forces, thereby allowing the user to custom tune the way the bike handles and pedals for their specific needs, tastes, or desires. Coupler 240 creates a dependency between the relative orientations of the pivot axes such that the geometry of frame assembly 12 can be adjusted while maintaining a desired leverage ratio and shock activation. Said in another way, adjustment of the geometric frame shape is independent of leverage ratio and shock activation.

Although coupler 240 is shown as a single member rigid connector between pivot pin 170 and pivot pin 206, it is appreciated that there are other methodologies for providing an operative association between the orientation of pivot assembly 144 and pivot assembly 160 with respect to either of seat tube 26, pivot pins 170, 206, and/or the movable suspension linkage members associated therewith. For instance, it is envisioned that the functionality of coupler 240 could be provided with a flexible or deflectable linkage member that interacts with one or more gears, a rack and pinion configuration, and/or a gear and flexible drive member configuration that simultaneously indexes or clocks the discrete axis of rotation associated with pivot pins 170, 206 so as to maintain the positional dependency therebetween relative to the underlying frame member. It is appreciated that there are a number of methodologies for generating a dependency between the relative orientation of the first pivot assembly relative to the second pivot assembly so as to maintain a desired leverage ratio of the suspension system for various geometric configurations of the same.

It is further appreciated that although pivot assemblies 144, 160 are shown as defining a radial association between the rocker arms 110, 112 and the chain stays 76, 78 and an eccentric association between the respective pivot assemblies 144, 160 and seat tube 26, the same functionality can be provided with other radial and eccentric associations. That is, it is envisioned that a suspension system can be provided having an eccentric interaction between the respective links or members of suspension frame portion 18 and a radial association between the corresponding pivot assembly and the respective member of fixed shape frame portion 16. It is further appreciated that although suspension frame portion 18 is shown as including chain stays, seat stays, and rocker arms, and a dampener secured between the rocker arms and the chain stays, other suspension configurations are envisioned such as suspension systems wherein one end of the dampener is supported by the fixed frame portion and/or connected in the parallel to between the suspension frame portion and the fixed shape frame portion as compared to the closed loop series connection of the dampener within the suspension frame portion 18, i.e. wherein both ends of the dampener are engaged with respective movable links of suspension frame portion as shown.

For example, it is envisioned that seat stays 72, 74 extend beyond seat tube 26 and directly engage dampener 140, that dampener 140 be positioned rearward of seat tube 26 and engage one or both of chain stays 76, 78, seat stays 72, 74, rocker arms 110, 112, and/or another movable link that is connected between a movable link associated with suspension frame portion and a portion of fixed shape frame portion 16. It is envisioned that the operative association of the eccentric orientation of pivot assemblies 144, 160 need only be coupled to one another so as to allow more than two geometric configurations of the suspension frame portion of the bicycle assembly, regardless of the specific configuration, shape, and number of links of the suspension frame portion of the bicycle assembly, and does so in a manner that creates a dependency between the geometric configuration of the suspension frame portion so as to provide a desired leverage ratio independent of the geometric configuration of the suspension frame portion.

A bicycle frame assembly according to a combination of aspects of the invention includes a number of rotatable members configured to absorb shocks and impacts associated with operation of the bicycle. The assembly includes a frame constructed to support a rider and a chain stay having a rearward end that extends toward a wheel hub and a forward end that is pivotably connected to the frame. An absorber is pivotably connected to the forward end of the chain stay and extends to a rocker arm that is pivotably connected to the frame. A seat stay is pivotably connected to a rearward end of the rocker arm and extends to the rearward end of the chain stay. The rearward ends of the seat stay and the chain stay are pivotably connected to rotate about a common axis. Such a construction provides a bicycle suspension system that has an absorbing member that is not rigidly connected to a fixed frame member as well as a suspension system with enhanced operation throughout a range of operating positions of the members of the suspension system. The suspension system maintains a reduced contact patch of the rear wheel over the range of motion of the suspension system thereby enhancing operation of the bicycle.

Therefore, one embodiment of the invention includes a bicycle frame assembly having a forward frame portion for supporting a rider. A rear wheel support assembly is connected to the forward frame portion and is movable to allow translation of a rear wheel relative to the forward frame portion. A first pivot assembly and a second pivot assembly connect the rear wheel support suspension assembly to the forward frame portion. Each of the first pivot assembly and the second pivot assembly are adjustable relative to the forward frame portion such that a pivot axis associated with each of the first pivot assembly and the second pivot assembly is individually infinitely eccentrically adjustable with respect to an orientation of the respective pivot assembly relative to the forward frame portion. The frame assembly includes a coupler that creates a dependency between the orientation of the first pivot assembly and the second pivot assembly relative to the forward frame portion such that the geometric configuration of the frame assembly can be adjusted without altering the leverage ratio associated with operation of the bicycle.

Another embodiment of the invention usable with one or more of the features of the above embodiment includes a bicycle frame assembly having a first frame portion that supports a crankset. A rear wheel support assembly, having a seat stay and a chain stay, is movable relative to the first frame portion. The assembly includes a rear wheel that rotatably cooperates with the rear wheel support assembly. A first pivot assembly and a second pivot assembly that are offset from one another each pivotably connect the rear wheel support assembly to the first frame portion. Each of the first pivot assembly and the second pivot assembly are rotatable about a pivot mount axis and define a respective link pivot axis that is offset from the respective pivot mount axis.

Another embodiment of the invention combinable with one or more of the features of the above embodiments includes a method of forming a bicycle suspension with a manipulatable suspension performance. The method includes connecting a first movable linkage member to a bicycle frame member with a first eccentric pivot assembly that is adjustable without removing the first eccentric pivot assembly from a bicycle assembly and connecting a second moveable linkage member to the bicycle frame with a second eccentric pivot assembly that is adjustable without removing the second eccentric pivot assembly from the bicycle assembly. The first pivot assembly to the second pivot assembly are coupled to one another such that an orientation of the first eccentric pivot assembly is dependent on an orientation of the second eccentric pivot assembly relative to the bicycle assembly and forms a path that is separate from paths associated with movable members of the bicycle suspension.

The present invention has been described in terms of the preferred embodiment, and it is recognized that equivalents, alternatives, and modifications, aside from those expressly stated, are possible and within the scope of the appending claims.

What is claimed is:

1. A bicycle frame assembly comprising:
   a forward frame portion for supporting a rider;
   a rear wheel support assembly connected to the forward frame portion and movable so as to allow translation of a rear wheel relative to the forward frame portion;
   a first pivot assembly and a second pivot assembly that connect the rear wheel support assembly to the forward frame portion, each of the first pivot assembly and the second pivot assembly being adjustable relative to the forward frame portion such that a pivot axis associated with each of the first pivot assembly and the second pivot assembly is individually infinitely eccentrically adjustable with respect to an orientation of the respective pivot assembly relative to the forward frame portion; and
   a coupler that creates a dependency between the orientation of the first pivot assembly and the second pivot assembly relative to the forward frame portion.

2. The bicycle frame assembly of claim 1 wherein the rear wheel support assembly is further defined as at least one seat stay, at least one chain stay, and at least one rocker arm.

3. The bicycle frame assembly of claim 2 wherein the at least one seat stay is pivotably connected to the at least one rocker arm, and one of the first pivot assembly and the second pivot assembly pivotably connect the at least one rocker arm to the forward frame portion, and the other of the first pivot assembly and the second pivot assembly pivotably connects the at least one chain stay to the forward frame portion.

4. The bicycle frame assembly of claim 2 wherein at least one of the at least one rocker arm and the at least one chain stay extend forward of a seat tube of the forward frame portion.

5. The bicycle frame assembly of claim 1 wherein the first pivot assembly and the second pivot assembly each include a first mount body, a second mount body, and a pivot pin that extends through the respective first and second mount bodies.

6. The bicycle frame assembly of claim 5 wherein at least one of the first mount body and the second mount body of at least one of the first pivot assembly and the second pivot assembly has a frustoconical shape having a reduced cross-sectional shape that faces a centerline plane of the forward frame portion.

7. The bicycle frame assembly of claim 5 wherein a respective pair of first and second mount bodies includes an opening that is shaped to cooperate with the respective pivot pin and wherein the opening is eccentric with respect to an axis of rotation of the respective one of the first pivot assembly and the second pivot assembly relative to the forward frame portion.

8. The bicycle frame assembly of claim 5 wherein the coupler includes a first end that rotationally cooperates with the pivot pin of the first pivot assembly and a second end that rotationally cooperates with the pivot pin of the second pivot assembly.

9. A bicycle frame assembly comprising:
   a first frame portion that supports a crankset;
   a rear wheel support assembly having a seat stay and a chain stay, the rear wheel support assembly being movable relative to the first frame portion;
   a rear wheel that rotatably cooperates with the rear wheel support assembly; and
   a first pivot assembly and a second pivot assembly that are offset from one another and that each pivotably connect the rear wheel support assembly to the first frame portion, each of the first pivot assembly and the second pivot assembly being rotatable about a pivot mount axis and defining a link pivot axis that is offset from the respective pivot mount axis;
   wherein the first pivot assembly and the second pivot assembly are infinitely adjustable with a 360 degree range of rotation of the respective pivot assembly relative to the first frame portion.

10. The bicycle frame assembly of claim 9 further comprising a coupler that creates a dependency between a respective position of the first pivot assembly and the second pivot assembly.

11. The bicycle frame assembly of claim 9 wherein the first pivot assembly and second pivot assembly cooperate with the first frame portion in at least three positions.

12. The bicycle frame assembly of claim 9 wherein the rear wheel support assembly is further defined as at least one chain stay and at least one seat stay that are pivotably connected to one another.

13. The bicycle frame assembly of claim 12 wherein an axis of rotation of the chain stay and the seat stay is concentric with respect to an axis of rotation of the rear wheel.

14. The bicycle frame assembly of claim 9 wherein the rear wheel support assembly includes a rocker arm that is connected to the first frame portion by the first pivot assembly.

15. The bicycle frame assembly of claim 14 wherein the rocker arm is disposed between a seat stay and a dampener.

16. A method of forming a bicycle suspension with a manipulatable suspension performance comprising:
   connecting a first movable linkage member to a bicycle frame member with a first eccentric pivot assembly that is adjustable without removing the first eccentric pivot assembly from a bicycle assembly;
   connecting a second moveable linkage member to the bicycle frame with a second eccentric pivot assembly that is adjustable without removing the second eccentric pivot assembly from the bicycle assembly; and
   coupling the first pivot assembly to the second pivot assembly such that an orientation of the first eccentric pivot assembly is dependent on an orientation of the second eccentric pivot assembly relative to the bicycle assembly and forms a path that is separate from paths associated with movable members of the bicycle suspension.

17. The method of claim 16 further comprising forming at least one of the first eccentric pivot assembly and the second eccentric pivot assembly to define a pivot axis that is eccentric with respect to an axis of rotation of the respective first eccentric pivot assembly and the second eccentric pivot assembly.

18. The method of claim 16 further comprising connecting a shock absorber in series between the first movable linkage member and the second movable linkage member.

19. The method of claim 18 further comprising forming the first movable linkage member as a rocker arm connected between the shock absorber and a seat stay.

20. The method of claim 19 further comprising forming the second movable linkage member as a chain stay and pivotably connecting a rearward facing end of the chain to a rearward facing end of the seat stay.

21. The method of claim 20 further comprising aligning the pivotable connection between the seat stay and the chain stay with an axis of rotation of a rear wheel.

* * * * *